United States Patent [19]
Wilde

[11] 3,729,153
[45] Apr. 24, 1973

[54] HIGH CAPACITY LOW POLLUTANT AIRPORT DESIGN

[76] Inventor: Harold A. Wilde, 6640 S. W. 129th Terrace, Miami, Fla. 33156

[22] Filed: Feb. 26, 1971

[21] Appl. No.: 119,210

[52] U.S. Cl. ............................................ 244/114 R
[51] Int. Cl. ................................................ B64f 1/00
[58] Field of Search ......................... 244/114, 114 R

[56] References Cited

UNITED STATES PATENTS

| | | | |
|---|---|---|---|
| 2,522,144 | 9/1950 | Stump | 244/114 R |
| 3,554,470 | 1/1971 | Dudley | 244/114 R |
| 2,400,841 | 5/1946 | Rogers | 244/114 R |
| 2,487,613 | 11/1949 | Stone | 244/114 R |
| 2,765,994 | 10/1956 | Jordanoff | 244/114 R |
| 3,558,085 | 1/1971 | Magill | 244/114 R |

OTHER PUBLICATIONS

"Strato-Port...Answer to Airport Problems?" Aviation Age, December 1953, pages 32, 33.
"Airports for the Present" Cosmorama, February 1969, pages 65–68.
"Preparation of Airport Layout Plans," Federal Aviation Agency, Advisory Circular, AC 150/5310–1, September 1965, Appendix 3.
"Airports at Sea," Time Magazine, May 30, 1969, Page 61.

*Primary Examiner*—Milton Buchler
*Assistant Examiner*—Paul E. Sauberer
*Attorney*—Li Blanc & Shur

[57] ABSTRACT

The airport construction includes a terminal area and a pair of generally parallel runways on opposite sides of the terminal area. Each of the runways has an end more proximate to the terminal area than its opposite end with the opposite ends extending in opposite directions from the proximate ends. Short or stub taxiways connect the proximate runway ends to the terminal area. Simultaneous aircraft landings and takeoffs are provided. Aircraft traffic is characterized as flowing from one end of the airport toward the terminal area and from the latter to the opposite end of the airport. The short taxiways reduce taxi time and distance for both landings and departures and, in conjunction with the flow through aircraft traffic pattern, minimize air and noise pollution.

9 Claims, 3 Drawing Figures

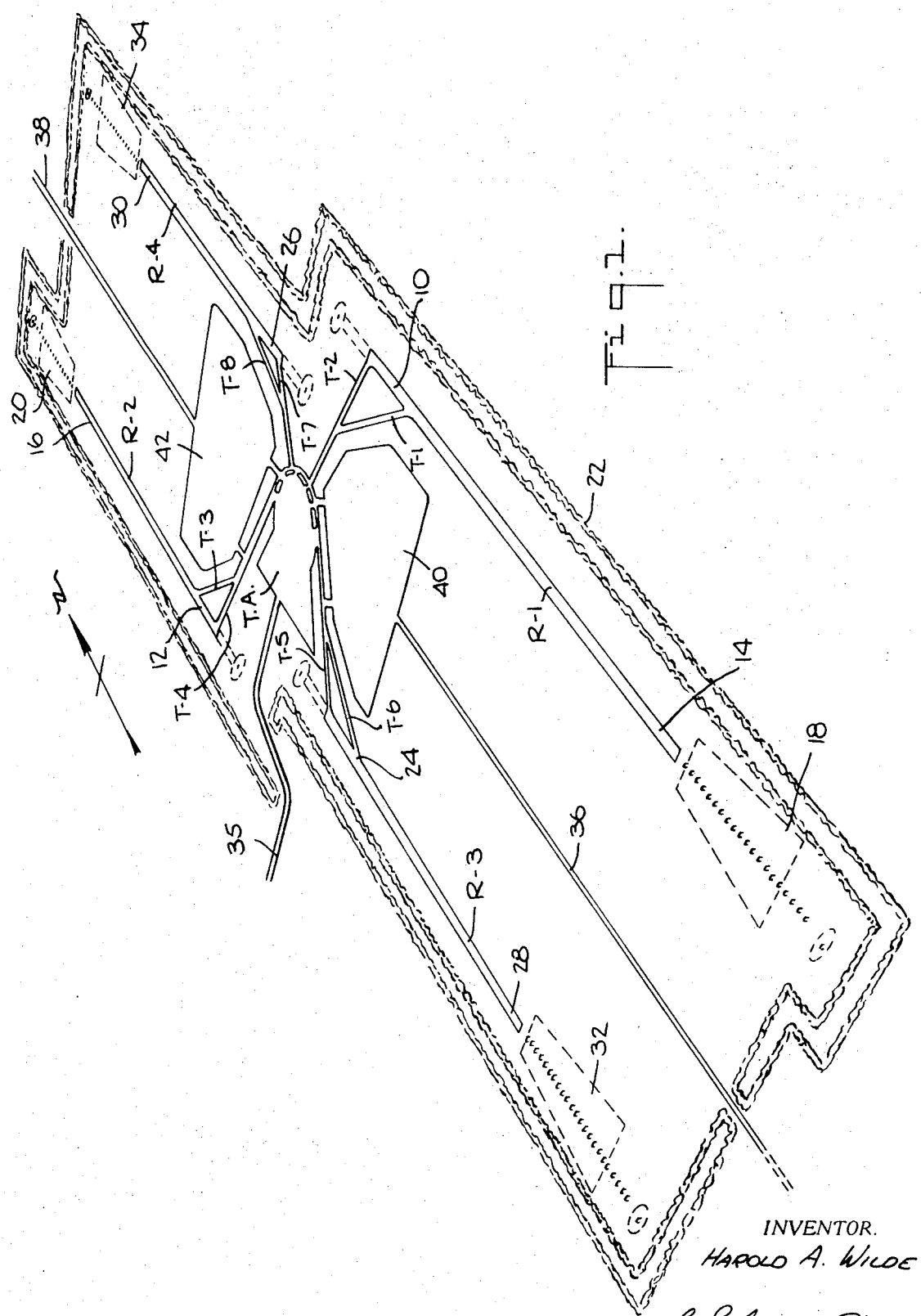

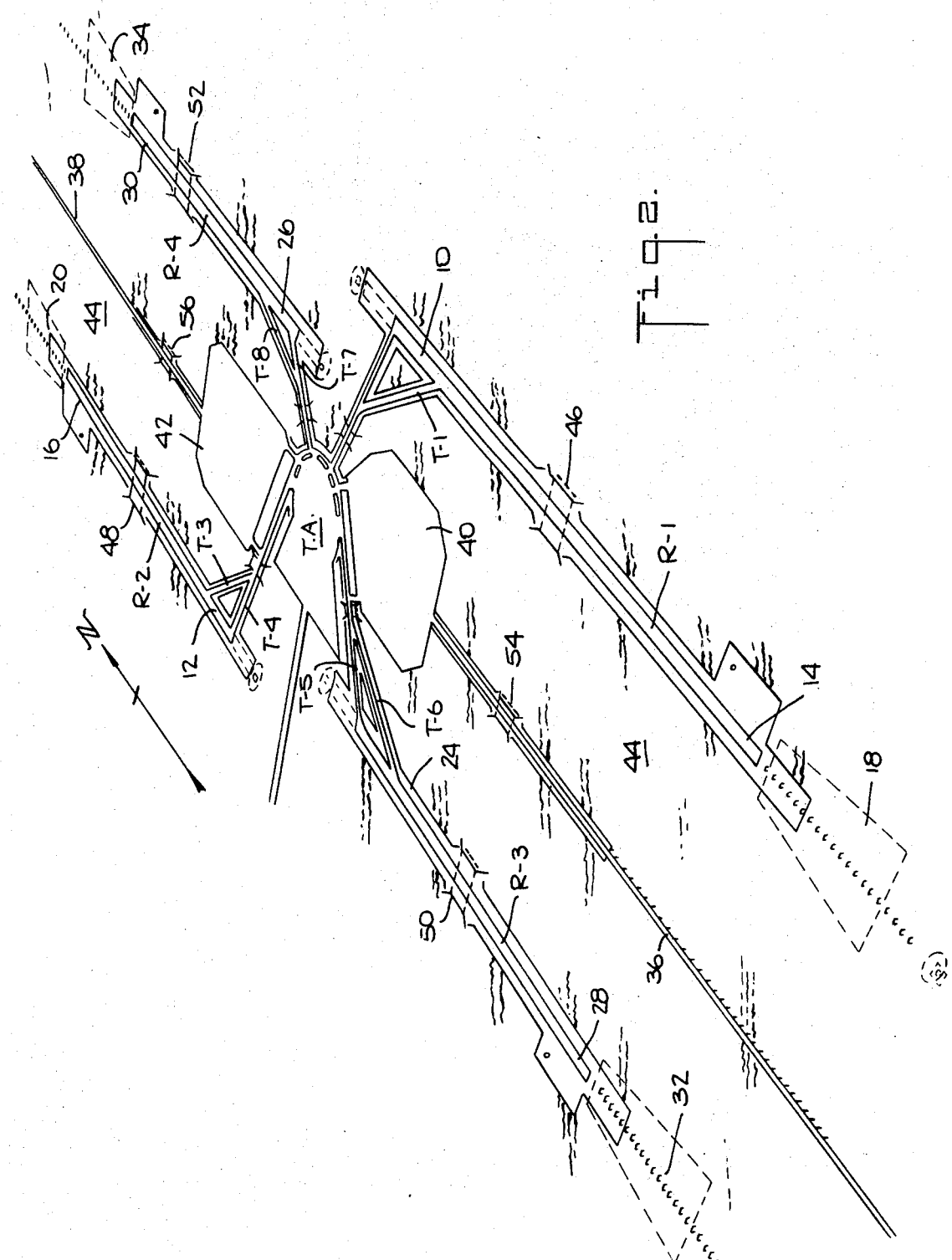

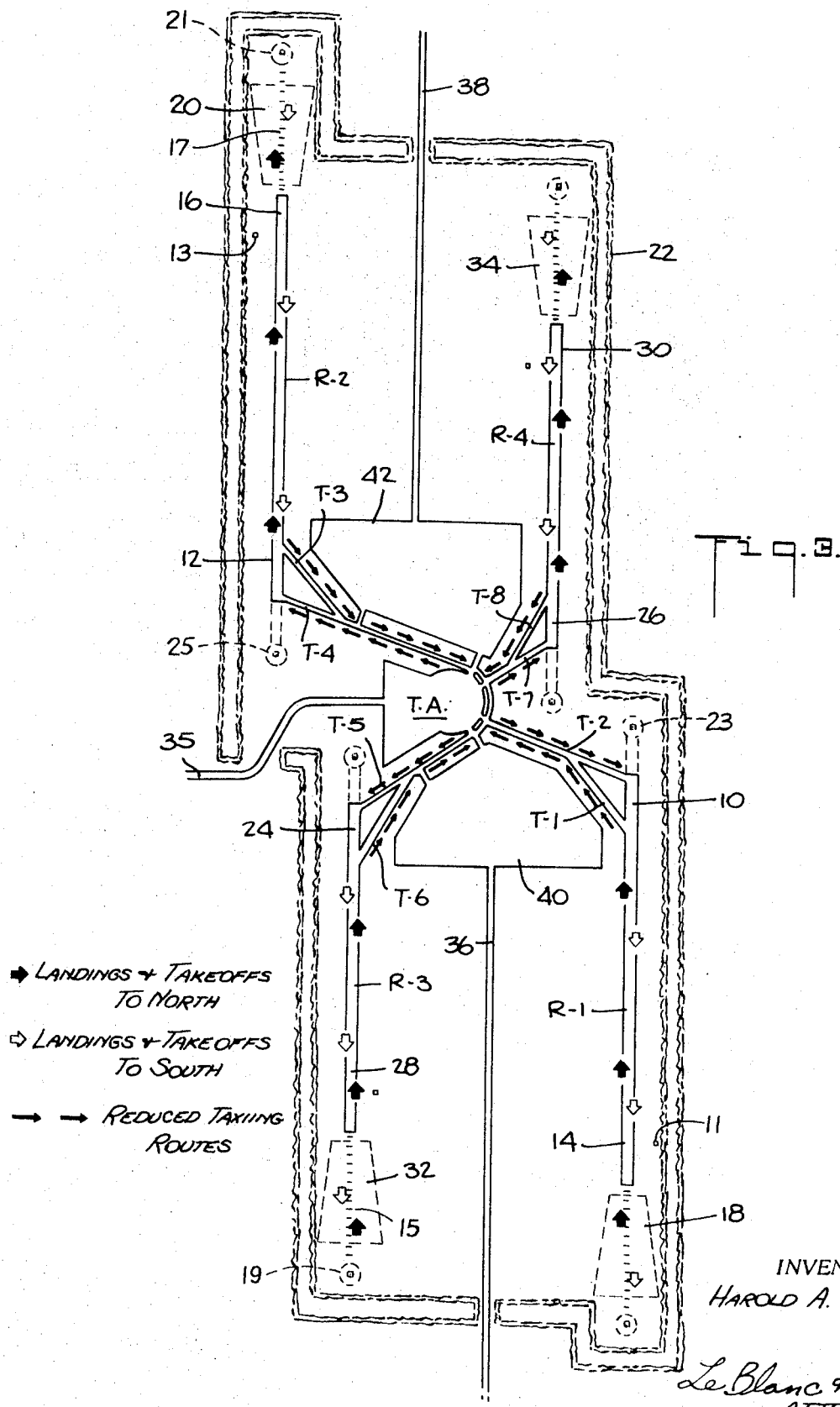

HIGH CAPACITY LOW POLLUTANT AIRPORT DESIGN

The present invention relates to airport construction and particularly relates to a novel airport construction having high aircraft handling capacity and minimum impact on the quality of the environment in which the airport is sited.

With the substantial increase in air traffic in recent years, it has become increasingly apparent that existing airports simply do not have the capacity to handle current or projected air traffic. In many situations, existing airports simply cannot be enlarged to accommodate increases in air traffic since such airports are normally located in or adjacent urban areas which are becoming increasingly populated. Additional land surrounding such airports simply becomes unavailable. Another and very significant aspect of the problem of a higher capacity airport is the effect that such airport has on the quality of the environment in the immediate area surrounding the airport. For example, with the ever increasing use of jet aircraft, noise and air pollution emanating from jet engines has reached levels in the areas surrounding existing airports which can no longer be tolerated. Thus, the problem of providing additional capacity to existing airports or constructing new high capacity airports consistent with the need for minimizing or reducing noise and air pollution attendant to airport operation has become critical.

The present invention provides a novel airport construction which minimizes or eliminates the foregoing and other problems associated with existing airports and provides a novel airport construction having various advantages in construction, operation and use in comparison with such prior airport facilities and particularly provides an airport construction having high aircraft handling capacity and minimum effect on the quality of the surrounding environment. To accomplish the foregoing, the present invention provides a novel airport construction having a terminal area and a pair of generally parallel runways extending on opposite sides of the terminal area, each runway being sufficient to accommodate aircraft landings and takeoffs. Each runway is located such that an end thereof is located proximate the terminal area, the runways extending in opposite directions from their proximate ends. Short or stub taxiways connect between the proximate ends of the runways and the terminal area. In utilizing this airport layout and depending upon wind direction, aircraft would use the remote ends of either runway in landing in a direction toward the terminal area. Simultaneously with the landing of an aircraft on one of the runways, another aircraft can be taking off on the second runway in a direction away from the terminal area. The traffic pattern of the present airport construction can thus be characterized as flowing through the airport in one direction. That is to say, the flow of aircraft is from one end of the airport toward the terminal area, i.e., landings, and from the terminal area in the same direction toward the opposite end of the airport, i.e., departures.

A feature of the foregoing airport layout resides in the very short taxiing distance between the terminal area and the proximate ends of the runways. The distance between the terminal area and either the aircraft's initial takeoff position on a runway or the position of the aircraft on the runway after landing and being slowed to taxiing speed is very significantly reduced in comparison with corresponding distances in existing airports. For example, an aircraft departing from an airport constructed in accordance with the present invention simply taxis along the stub or short taxiways the short distance from the terminal area to the proximate end of a runway in order to obtain a position for takeoff. Further, an incoming aircraft lands adjacent the remote end of the other runway and, when taxiing speed is obtained, is located in position close to the end of the runway proximate the terminal area whereat a short taxiing distance to the terminal area remains.

Not only does the foregoing described unique aircraft flow pattern increase the capacity of the airport and reduce aircraft takeoff and landing time, but also reduces and minimizes noise and air pollution as the time in which the aircraft engines are running is substantially reduced. It has been found, with the foregoing arrangement of runways and terminal area, that taxiing distances in comparison with existing airports are cut approximately in half with consequent savings in taxiing costs and reductions in noise and air pollution.

Reductions in noise and air pollution are also provided in the present airport construction by elimination of the need for using reverse thrust upon landing since landing aircraft can roll the full length of the runway toward the terminal area. Reverse thrust procedures upon landing cause higher than usual jet engine noise and objectionable emissions from the jet engines. Thus by entirely eliminating the requirement for reverse thrust, the attendant noise and air pollution problems are also eliminated. Furthermore, the present airport construction concentrates the existing noise and air pollution caused by the aircraft in the central or terminal area of the airport. This reduces the noise and air pollution levels at the perimeter of the airport and areas surrounding the airport.

A further and very significant feature of the airport construction hereof resides in the elimination of taxiway crossings with respect to the runways. Since the runways extend from adjacent the terminal area in opposite directions, and the taxiways connect the proximate ends of the runways directly with the terminal area, there is no need for taxiways crossing the runways.

Accordingly, it is a primary object of the present invention to provide a novel airport construction having high aircraft handling capacity and reduced effect on the quality of the environment.

It is another object of the present invention to provide a novel airport construction wherein taxiing time and distances are minimized.

It is still another object of the present invention to provide a novel airport construction wherein the flow of aircraft through the airport is in one direction, that is from one end of the airport to its opposite end.

It is a further object of the present invention to provide a novel airport construction wherein the high noise and objectionable fuel burn emissions from aircraft emanating from use of reverse thrust upon landing is entirely eliminated.

It is still a further object of the present invention to provide a novel airport construction wherein the existent noise and air pollution caused by the aircraft is concentrated at the center of the airport adjacent the terminal area thus reducing the effect of such pollution about the perimeter of the airport.

It is a still further object of the present invention to provide a novel airport construction wherein the existent noise and air pollution caused by the aircraft is abated by bands of trees planted around the airport which regenerate oxygen and absorb the sound waves from the jet engines.

It is a still further object of the present invention to provide a novel airport construction having the foregoing characteristics and which can be economically constructed and affords sufficient area for expansion including two additional runways.

These and further objects and advantages of the present invention will become more apparent upon reference to the following specification, appended claims and drawings wherein:

FIG. 1 is a perspective view of an airport constructed in accordance with the present invention and illustrating the orientation of the runways, instrument landing facilities terminal area, connecting stub or short taxiways, and treelines;

FIG. 2 is a view similar to FIG. 1 with the airport sited in an aqueous environment and illustrating further the possible locations of minimum length culverts for waterflow, and protection of marine life; and FIG. 3 is a plan view of the airport construction illustrated in FIG. 1 illustrating the landing, takeoff and taxiway paths of inbound and outbound aircraft.

Referring now to the drawings, particularly to FIG. 1, there is illustrated an airport constructed in accordance with the present invention including a terminal area T.A. having one or more buildings housing the usual passenger and baggage handling facilities, aircraft maintenance areas, and other facilities ancilliary to operation of an airport. Spaced on opposite sides of the terminal area are a pair of runways R-1 and R-2, each having a length sufficient to accommodate aircraft landings and takeoffs. A significant feature of the present invention wherein a high capacity airport having minimum environmental effect is provided resides in the orientation of the runways relative to the terminal area. As illustrated in FIG. 1, the runways R-1 and R-2 extend in generally parallel relation one to the other on opposite sides of the terminal area T.A. End portions 10 and 12 of runways R-1 and R-2 respectively terminate near or proximate terminal area T.A. with the runways extending therefrom in opposite directions and terminating in respective runway end portions 14 and 16 adjacent opposite ends of the airport. Conventional aircraft landing approach facilities 18 and 20, for example, glide paths 11 and 13, approach lights 15 and 17, and middle markers 19 and 21, are respectively located adjacent the remote ends of runways R-1 and R-2 as illustrated while localizers 23 and 25 are located beyond the proximate end portions 10 and 12. Short or stub taxistrips T-1 and T-2 connect the proximate end portion 10 of runway R-1 with the terminal area T.A. Similar short or stub taxistrips T-3 and T-4 connect the proximate end portion 12 of runway R-2 with the terminal area T.A. Since the proximate end portions 10 and 12 of runways R-1 and R-2 respectively lie on substantially diametrically opposite sides of the terminal area, as illustrated, the taxiways T-1 - T-4 extend substantially radially from the terminal area T.A., and thus comprise taxiways connecting the runways with the terminal area through substantially the shortest possible distance.

In order to fully appreciate the extent to which the foregoing described airport construction provides significantly improved aircraft landing and takeoff capacity as well as reduced effects on the quality of the environment in which the airport is sited, reference is made to FIG. 3 wherein the paths of inbound and outbound aircraft are illustrated. It will be appreciated that each of the runways can be utilized for either takeoffs or landings. Depending upon wind direction, aircraft would land on the remote end portions 14 or 16 of the runways R-1 and R-2 respectively in a direction toward the terminal area T.A. Thus, at the time that an aircraft has obtained a runway speed permitting taxiing operations, it has already obtained a position on the runway relatively close to the terminal area T.A. and near the taxistrips T-1, T-2, T-3 or T-4 as the case may be. Thus, the taxiing distance and time for movement of the landed aircraft into the terminal area is substantially reduced in comparison with existing airport designs wherein parallel taxistrips extending distances substantially on the order of the runway length itself must be traversed. It will also be appreciated that the taxiing distance and time for a departing aircraft to move from the terminal area T.A. into an initial takeoff position on the proximate end portion of either runway R-1 or R-2 is similarly reduced due to the location of the runways relative to the terminal area permitting the use of short or stub taxistrips. Thus, taxiing time and distance for aircraft departures is also significantly reduced in comparison with taxiing times and distances necessary in existing airports. It will also be appreciated that, with the foregoing design, simultaneous aircraft landings and takeoffs can be accomplished on the separate runways due to their parallel but offset relation one from the other.

The foregoing described airport construction significantly reduces the effects of airport operation on the quality of surrounding environment. Particularly, it will be noted that each runway R-1 and R-2 has sufficient length to accommodate aircraft landing without use of reverse thrusters thereby eliminating the considerable and increased noise and objectionable emissions from jet engines attributable to such use. Further, since the taxiing time and distance is reduced in comparison with existing airports due to the particular relative location of the runways and terminal area of the airport construction hereof, the noise and air pollution is thus also correspondingly reduced. Further, the nose and air pollution generated by taxiing operations is, in accordance with the present invention, concentrated in the central portion of the airport spaced well inside the perimeters of the airport whereby pollution of areas surrounding the airport is further reduced.

As a further measure to reduce the effects of noise and air pollution, the airport is oriented such that strip groves of trees may be planted along the entire length of the exterior clearance lines of all runways and around the remainder of the airport perimeter. Such strip groves are indicated at 22. These plantings dissipate the pollution from engine noise and serve to regenerate the oxygen supply in the immediate area.

It is a further feature hereof that the foregoing described airport can be readily expanded by the addition of two runways, the airport obtaining the foregoing described features notwithstanding such additions. Particularly, one or more runways R-3 and R-4 extending parallel one to the other and to the runways R-1 and R-2 may be provided on opposite sides of the terminal area T.A. with their proximate end portions 24 and 26 spaced on substantially diametrically opposite sides of the terminal area. The runways R-3 and R-4 extend from their proximate end portions 24 and 26 in opposite directions distances sufficient to accommodate both aircraft landings and takeoffs and terminate in end portions 28 and 30 respectively. Runways R-3 and R-4 also have separate landing approach facilities 32 and 34 respectively and including localizers 33 and 37 beyond the proximate ends of runways R-3 and R-4. Runways R-3 and R-4 are laterally offset from runways R-1 and R-2 whereby simultaneous aircraft departures and landings can be accomplished. Also, short taxistrips T-5 and T-6 connect the proximate end portion 24 of runway R-3 with the terminal area T.A. Short taxistrips T-7 and T-8 connect the proximate end portion 26 of R-4 with the terminal area T.A. The arrangement of runways R-3 and R-4 and the associated taxistrips is similar to the arrangement of runways R-1 and R-2 and their associated taxistrips whereby minimum taxiing time and distances are obtained for both landings and takeoffs and the effects on the quality of the environment are similarly reduced.

It will be appreciated that the various taxiways hereof do not cross one or more of the runways R-1 – R-4, thereby enhancing the safety aspects of control of ground taxiing aircraft. Also, the foregoing described airport construction is readily accessible to land vehicular traffic via roadways 35, 36 and 38 which also do not cross the runways or taxistrips. Further, the areas denoted 40 and 42 provide additional terminal area for expansion between runways R-1 and R-3 and between runways R-2 and R-4 respectively as the airport facility grows.

The foregoing described airport layout may also be sited in an aqueous environment. The novel longitudinal unit design permits the construction of reasonably short culverts or sluiceways under the runways or taxiways to facilitate tidal flows and aid in the protection of normal marine growth and activity. For example, and referring now to FIG. 2, the runway terminal area T.A. and taxiways described with respect to FIGS. 1 and 3 are illustrated in an aqueous environment, generally indicated 44. It will be appreciated that any suitable construction for support of the runways, taxistrips and terminal area in an aqueous area may be provided, this being conventional construction not forming a part of this invention. Culverts 46, 48, 50 and 52 may be disposed under runways R-1 – R-4 respectively with even smaller culverts 54 and 56 being provided under the connecting roadways 36 and 38. This design minimizes the effect on the environment.

It is a particular feature of the present invention that the flow of aircraft in landing and taking off is through the airport, that is, from one end of the airport to its opposite end. Particularly, aircraft land at one end of the airport on one of the runways and approach the terminal area where passengers and/or freight are offloaded. After loading, the aircraft leaves the terminal area and moves to the proximate end portion of the other runway. The aircraft thus departs from the opposite end of the airport from which it landed. In essence, the aircraft flow from one end of the airport to the opposite end without encountering crossing aircraft.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An airport comprising a terminal area, first and second runways disposed along respective first and second laterally spaced generally parallel lines, said terminal area lying substantially wholly between and not intersecting said lines, a third runway disposed along a third line laterally spaced from and generally parallel to said first and second lines, said third line lying on the same side of said terminal area as said first line and laterally spaced from said terminal area, each of said runways having a length sufficient to accommodate aircraft landings and take-offs and not substantially longer than to accommodate a single landing or take-off, each of said runways having an end portion more proximate said terminal area than its opposite end portion, said proximate runway end portions being spaced from said terminal area with said second and third runways extending in like directions from their proximate end portions and said first runway extending in the opposite direction from its proximate end portion, said third runway extending from its proximate end portion in a direction generally opposite to the direction that said first runway extends from its proximate end portion; at least one taxiway connecting each of said proximate runway end portions and said terminal area, said second and third runways being located wholly on one side of a line normal to said parallel lines and passing through the terminal area with said first runway lying wholly on the opposite side of said line.

2. An airport according to claim 1, including a fourth runway disposed along a fourth line laterally spaced from and generally parallel to said parallel lines, said fourth line lying on the same side of said terminal area as said second line and being laterally spaced from said terminal area, said fourth runway having a length sufficient to accommodate aircraft landings and take-offs and not substantially longer than to accommodate a single landing or take-off, said fourth runway having an end portion more proximate said terminal area than its opposite end portion and spaced from said terminal area, said fourth runway extending in a like direction from its proximate runway end portion as said first runway extends from its proximate end portion, at least one taxiway connecting the proximate runway end portion of said fourth runway with said terminal area, said fourth runway being located wholly on one side of the line normal to the parallel lines and on the same side thereof as said first runway.

3. An airport according to claim 2 wherein said proximate runway end portions lie on generally opposite sides of said terminal area, landing approach facilities extending beyond said opposite ends of each of said runways, and means extending substantially about the periphery of said airport for abating noise and air pollution.

4. An airport according to claim 2, wherein the taxiway connecting any one of said runways with said terminal area does not intersect any one of the other of said runways.

5. An airport according to claim 2, including a roadway connected with said terminal area and extending between the proximate runway end portions of said first and third runways.

6. An airport according to claim 1, wherein the taxiway connecting said first runway and said terminal area does not cross said third runway, the taxiway connecting said third runway and said terminal area not crossing said first runway.

7. An airport according to claim 1, situated in an aqueous environment, at least one culvert underlying and extending between opposite sides of one of said runways.

8. An airport according to claim 1, wherein said proximate runway end portions lie on generally opposite sides of said terminal area, landing approach facilities extending beyond said opposite ends of each of said runways, and means extending substantially about the periphery of said airport for abating noise and air pollution.

9. An airport design according to claim 1 wherein said abatement means includes groves of trees substantially surrounding said airport.

* * * * *